United States Patent
Guerin et al.

(10) Patent No.: US 7,194,632 B2
(45) Date of Patent: Mar. 20, 2007

(54) METHOD FOR SECURE BIOMETRIC AUTHENTICATION/IDENTIFICATION, BIOMETRIC DATA INPUT MODULE AND VERIFICATION MODULE

(75) Inventors: Didier Guerin, Caen (FR); Marc Girault, Caen (FR)

(73) Assignee: France Telecom, Paris (FR)

( * ) Notice: Subject to any disclaimer, the term of this patent is extended or adjusted under 35 U.S.C. 154(b) by 639 days.

(21) Appl. No.: 10/312,243

(22) PCT Filed: Jun. 22, 2001

(86) PCT No.: PCT/FR01/01989

§ 371 (c)(1),
(2), (4) Date: Jun. 30, 2003

(87) PCT Pub. No.: WO01/99337

PCT Pub. Date: Dec. 27, 2001

(65) Prior Publication Data
US 2004/0015705 A1    Jan. 22, 2004

(30) Foreign Application Priority Data
Jun. 23, 2000    (FR)    .................................. 00 08070

(51) Int. Cl.
*H04K 1/00*    (2006.01)
*H04L 9/00*    (2006.01)

(52) U.S. Cl. ...................................................... 713/186
(58) Field of Classification Search ...................... None
See application file for complete search history.

(56) References Cited

U.S. PATENT DOCUMENTS 5,351,295 A      9/1994   Perlman et al.
6,317,834 B1 *  11/2001   Gennaro et al. ............ 713/186

FOREIGN PATENT DOCUMENTS

| EP | 0 986 209 A2 | 6/1999 |
|----|--------------|--------|
| GB | 2329499 A | 3/1999 |
| WO | WO97/05578 | 2/1997 |
| WO | WO 98/25385 | 6/1998 |
| WO | WO98/32093 | 7/1998 |
| WO | WO 00/00882 | 1/2000 |

* cited by examiner

*Primary Examiner*—Gilberto Barron, Jr.
*Assistant Examiner*—Kristin D. Sandoval
(74) *Attorney, Agent, or Firm*—Patterson, Thuente, Skaar & Christensen, P.A.

(57) ABSTRACT

A secure biometric authentication method, comprising communication of biometric data to a verification module. The invention is characterized in that it consists in encrypting the biometric data with a cryptographic algorithm and in introducing for each cryptographic operation carried out a different diversification value.

15 Claims, 3 Drawing Sheets

Enciphering $C = ev\ (E+VD)$
(+: concatenation)

Deciphering Verification $dv(C) \Rightarrow E+VD$ $C' = ev\ (E+VD')$ $dv(C') \Rightarrow E + VD'$

METHOD FOR SECURE BIOMETRIC AUTHENTICATION/IDENTIFICATION, BIOMETRIC DATA INPUT MODULE AND VERIFICATION MODULE

BACKGROUND OF THE INVENTION

The present invention concerns a method for authenticating/identifying secure biometric data.

1. Field of the Invention

An explanation of the authentication method is given in the rest of the text for the purposes of simplification.

The invention also concerns a biometric data input module and a module for verifying said data making it possible to implement the method, the cooperation of these two modules forming part of the embodiment of an authentication system.

The invention is applicable specifically to the field of biometric authentication or identification with verification by a device placed some distance away via a communication network.

A biometric data entry module is understood to be any device, such as a biometric sensor, making it possible to record the biometric elements of a user of the authentication system.

A biometric data verification module is understood to be any device able to process the biometric information so as to verify it and its authenticity. It can be a data processing computer or a specific electronic card placed in a processing system.

2. Description of the Related Art

The patent published on 23 Jul. 1998 under the number WO98/32093 describes a method for preventing the replay of the biometric data.

Replay is understood to be any ill-disposed action consisting of capturing the biometric data of a user of the authentication system so as to send said data to the verification device and thus claim to be said user.

The method describes in this application is based on the fact that the characteristic biometric elements, also called "minutiae" never have the same value between two inputs. The method described is limited in the fact that it needs to store the "minutiae" received from preceding authentication and identification tests and in the fact that it is unable to take precautions against replayed data after having been slightly modified deliberately so as to cheat the system.

There are also systems able to implement a biometric method with remote verification of the minutiae and thus the sending of data via a communication network.

In this case, either the solutions put forward do not take into account the problems linked to theft and the replay of data or they associate cryptographic secrets in the various modules of the system. For example, it is possible to find this solution on the patent application published on 06 Nov. 1998 under the number WO/9825385. In fact, the method described in this patent protects the data from being overheard on the line but is unable to prevent the replay of said data. The two communicating modules have available a pair of private keys.

In the case of secrets present in the various modules of the system, there is a risk that the secrets stored in these various modules may be stolen. The theft of the secret(s) stored in the various modules can bring about the actual theft of the modules themselves and in particular of the biometric input module which is placed to be accessible by the public.

However, in certain existing solutions, the modules and in particular the biometric input module are not designed to memorise the secret internally, but it is necessary when the secret is provided by the user by means for example of a smart card or badge.

These systems are described for example in the patent application published on 24 Mar. 1999 under the number GB 2329499 or in the patent application published on 13 Feb. 1997 under the number WO97/05578.

With the solution of this last-mentioned document, the simplicity of use and the ergonomics of the biometry becomes indistinct since the user wears or carries a physical tool (a smart card or a badge).

OBJECTS AND SUMMARY OF THE INVENTION

The object of the present invention is to resolve these drawbacks.

In fact, the invention is able to provide a biometric identification or authentication method organised around biometric input modules connected by means of a communication network, not necessarily secure, to one or several biometric verification modules whilst avoiding attacks by the replay of data without forcing the user to wear a physical object (smart card) and without requiring the presence of one or several secrets in the biometric input module(s).

Thus, the invention concerns a secure biometric method including an element for protection against the replay of data and a cryptographic element ensuring the confidentiality of the data, none of these elements requiring the presence of a secret at the location where the biometric characteristics are input, said data including biometric data, such as minutiae.

Protection is applicable between a local biometric module, known as the biometric input module, and a distant module, known as the biometric verification module.

For a user wishing to be authenticated, the implementation of the method is clear. Said user does not require the wearing of any physical tool for implementing the method. It is no longer necessary for the biometric verification module to memorise values on each authentication.

The method makes it possible in particular to carry out this authentication from distant biometric modules of the verification module and connected for example via a communication network not requiring any special protection.

The authentication method put forward makes it possible to avoid storing a secret in the biometric input module. It is also able to guarantee the non-replay of a sending of biometric data.

Generally speaking, the invention is applicable to biometric systems.

Thus, the object of the present invention is more particularly to provide a secure biometric authentication method including the communication of enciphered biometric data to a verification module, mainly characterised in that it consists of enciphering the biometric data by means of a cryptographic algorithm and in that it consists of introducing for each cryptographic operation carried out a different diversification value.

According to one embodiment, the diversification value is generated by the verification module and sent to the biometric data input module.

According to another embodiment, the diversification value is generated by the input module and by the verification module.

The diversification value is associated with the biometric data element, the enciphering operation being carried out on the data element obtained by this association.

According to one variant, the diversification value is a random data element.

According to another variant, the diversification value is the result of a counting.

According to another variant, the diversification value is time data (date, hour).

According to one embodiment, the enciphering algorithm is a public key asymmetrical algorithm.

According to one variant, the public key of the verification module is sent to the input module(s) by the verification module on each request for authentication.

According to another variant, the public key is stored in the biometric data input module.

According to another variant, the key stored in the input module is a certificate verification key, said certificate being the certificate of the public key of the verification module and being sent by the latter to the input module.

According to another embodiment, the enciphering algorithm is a secret key symmetrical algorithm.

Advantageously, the secret key is generated by the input module.

Advantageously, the secret key is enciphered by an asymmetrical algorithm and the result of the enciphering is sent to the verification module to enable the latter to decipher the biometric data.

The invention also concerns a biometric data input module mainly characterised in that it comprises means to carry out cryptographic operations so as to encipher the biometric data and introduce a different diversification value for each operation according to any one of the preceding claims.

According to another characteristic, the diversification value is generated by the module itself or provided from the outside world.

The invention also concerns a biometric data verification module mainly characterised in that it comprises means to carry out the cryptographic operations so as to decipher the enciphered biometric data received via a communication network and containing a different diversification value for each enciphered biometric data element.

Advantageously, the biometric data verification module can be connected by the communication network to a plurality of biometric data input modules.

According to another characteristic, the diversification value is generated by the verification module itself.

The biometric data input modules and the verification module can be connected by an unprotected communication network.

Other characteristics and advantages of the invention shall appear more clearly from a reading of the following description given by way of non-restrictive example and with reference to the accompanying drawings on which:

DESCRIPTION OF THE PREFERRED EMBODIMENTS

Figure 1:
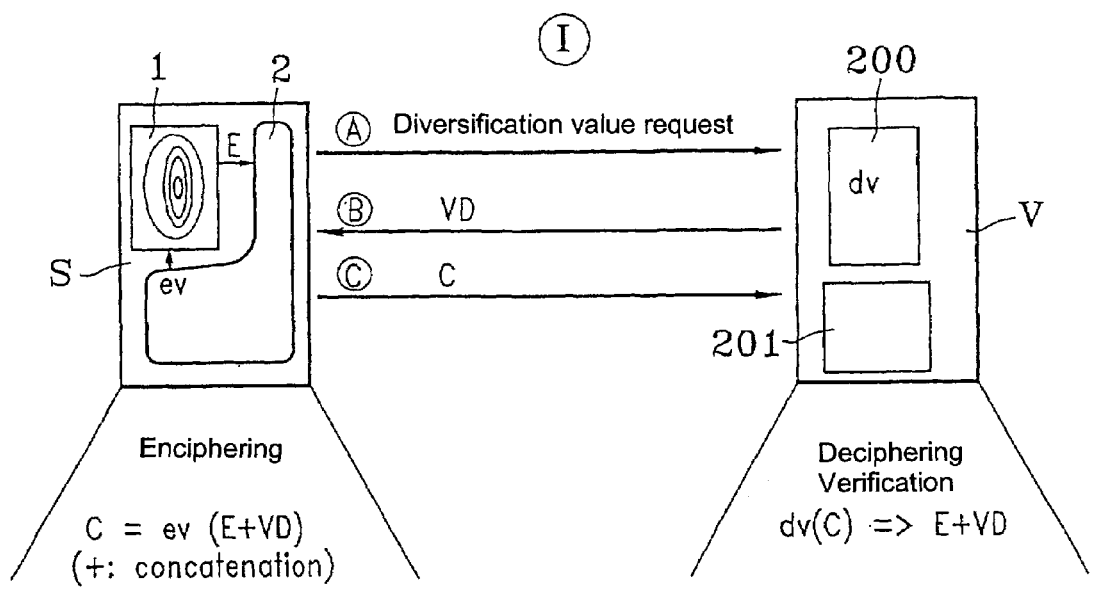
FIG. 1 diagrammatically shows the implementation of a protected authentication method according to the invention.
Figure 1:
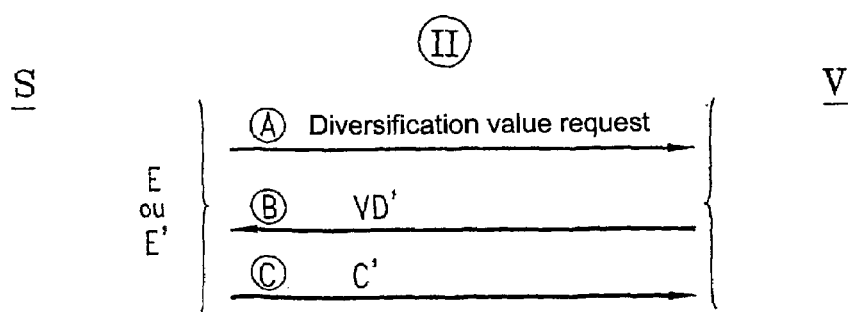

Reference is made first of all for the remainder of the description to the diagram of FIG. 1, namely its sections I and II respectively showing a first and a second activation of the biometric authentication method.

The embodiment, which is given by way of example uses as a cryptographic protocol public key algorithm, such as the RSA (Rivest Shamir Adleman) algorithm.

The RSA algorithm is not the only protocol able to be suitable for implementation of the method. All the key exchange protocols, such as those described in the standard ISO/IEC DIS 11770-3 entitled Information Technology Security Techniques Key Management—part 3: *Mechanism Using Asymmetric Techniques* are suitable to the extent that the mechanism used makes it possible to authenticate the entity responsible for verifying the biometric identification/authentication and to the extent that this entity is the one transmitting the diversification element which shall be described subsequently.

The biometric input module S uses a diversification module VD to protect the communication of the biometric elements of the user against replay. This value can be a random value, the result from a counter, a time element, etc.

The biometric process is activated as soon as a user activates the input module S by appearing in front of the biometric sensor 1.

The activation provokes the generating of a diversification value VD.

In a first embodiment for implementing the method shown by this FIG. 1, the generation of the diversification value is carried out by the verification module V.

This is why the activation of the method is expressed for this embodiment by a request for the diversification module VD of the input module S at the verification module V (action A on the drawing).

The biometric verification module V then sends a diversification value to the biometric input module S (action B). The biometric input module S extracts the characteristic elements E of the biometric element, associates it with the diversification element VD and carries out a enciphering operation C mainly concerning these parameters under the control of the public asymmetric cryptographic function $e_v$, and send the result C to the verification module (action C).

The enciphering operation is expressed by the following equation $$C=e_v(E+VD).$$

(the sign "+" symbolises a data concatenation operation.)

The cryptographic calculation makes it possible to guarantee that only a person possessing the appropriate private key shall be able to interpret correctly the sent biometric data and verify that the diversification element has been taken into account and by verifying that:

dv(C) is equal to (E+VD), dv being the deciphering function.

Replay is avoided as if a new authentication procedure is implemented for a given person, that is a person who would have a given biometric data element E, the diversification value, which is generated (and sent by the verification system), shall not be the same and shall be equal to a value VD', as shown on part II of the diagram of FIG. 1. In other words, an unauthorised person who during the stage I would have succeeded in obtaining the information C on the line and would replay this enciphering information C would nevertheless be unable to proceed further at the time of verification as the diversification value is no longer VD but a new value VD'.

According to the embodiment described above, the diversification value VD is generated by the biometric verification module and sent to the biometric input module (action A).

According to another embodiment, it is possible for the diversification value to be generated by the biometric input module itself. In this case, the biometric verification module shall be able to also itself generate this diversification value. It can be understood that in this case this does not concern a random value but a date for example. Thus, the verification module shall be able to verify that the data sent does not constitute the replay of a previous sending. (The action A disappears in this embodiment).

According to this embodiment, the biometric input module comprises in its memory the public key of the public key asymmetrical cryptographic algorithm so as to carry out the cryptographic calculation under the control of the public asymmetrical cryptographic key of the biometric verification module. This cryptographic calculation ensures, as indicated, to guarantee that only the biometric verification module owning the appropriate private key dv shall be able to interpret correctly the sent biometric data and verify that the diversification value has been taken into account.

According to another embodiment, it is possible for the key stored permanently in a memory of the biometric input module is a certificate verification key. In this case, the biometric verification module V sends the biometric input module a diversification element VD and its certified public enciphering key Cert($PUBe_v$). The certificate is verified with the key contained permanently in the memory of the biometric input module. After positive verification of the certificate, the biometric input module uses the public key of the biometric verification module so as to ensure confidentiality of the biometric data to be next transferred to the biometric verification module.

According to another embodiment, it is possible for the input module to generate a secret key cl so as to encipher the data to be transferred with the aid of a symmetrical algorithm using this cl. Generally speaking, the algorithm used could be a DES (Data Encryption Standard) algorithm. The input module then enciphers the concatenated data E+VD with the aid of this symmetrical algorithm and the secret key cl generated for this purpose and transmits the enciphered data to the verification module. As the verification module does not have the secret key generated by the input module, the latter sends the secret key enciphered by the public key algorithm to enable the verification module to decipher the received data. The verification module carries out the reverse function corresponding to the enciphering algorithm so as to obtain the deciphered value E+VD.

In addition, it is possible that the private key cl be concatenated to one random variable and to encipher the data element obtained with the aid of the public key algorithm.

Figure 2:
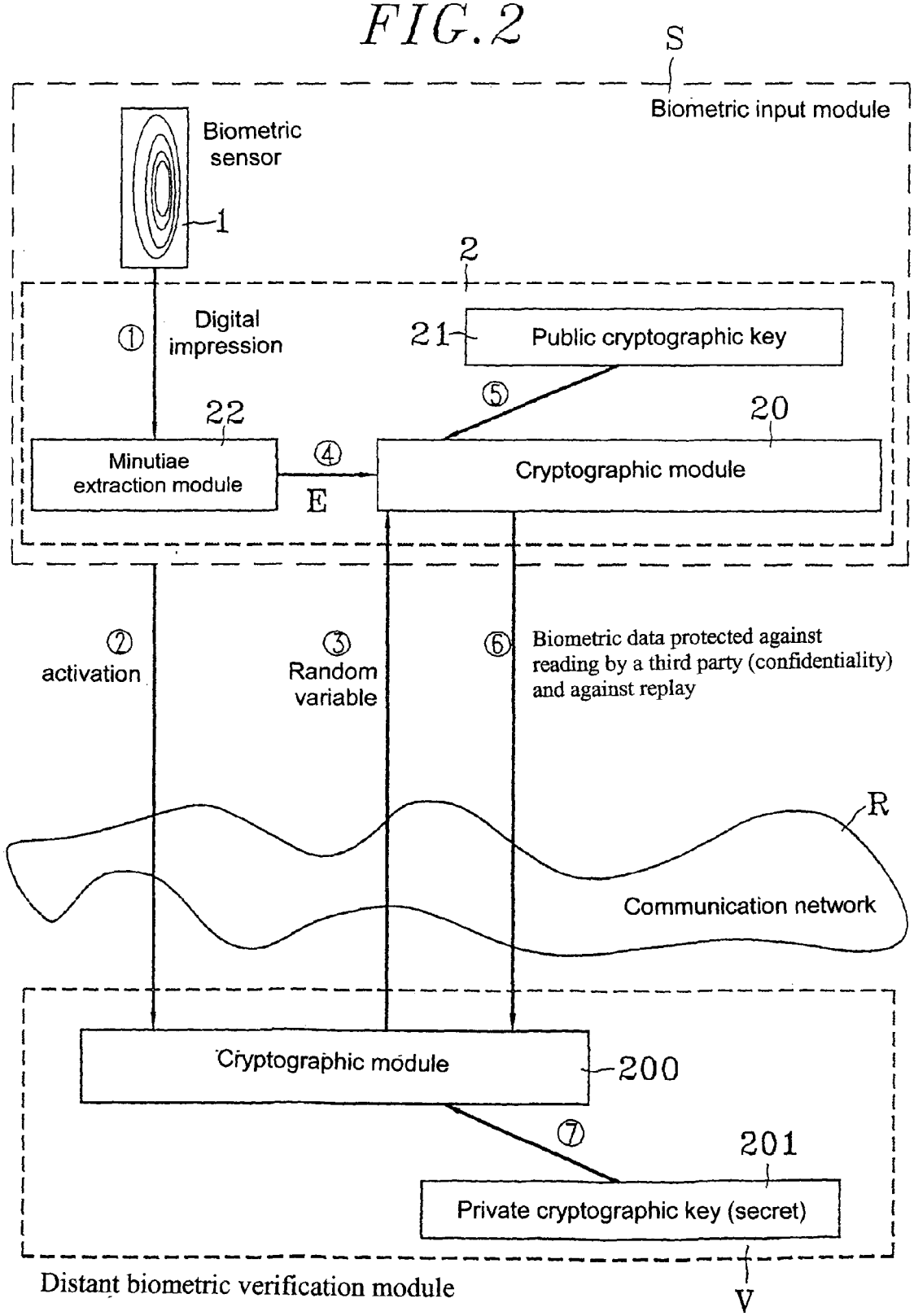
FIG. 2 shows an implementation diagram for implementing the method in a biometric input module and in a distant biometric verification module.

Reference is now made to the diagram of FIG. 2. This diagram shows the implementation of the method of the invention in a biometric input module S and in a distant biometric verification module V. The biometric input module traditionally comprises a biometric sensor 1. This sensor provides a digital impression of a user of the system with a minutiae extraction module 22 able to send the elements E derived from this extraction to the cryptographic module 20 inside the biometric input module S. The cryptographic module is embodied for example by a commercial crypto-processor associated with a non-volatile memory 21 including the public key, namely the parameters $PUBe_v$ (if $PUBe_v$ is the name of this key).

As this can be followed from the enciphering 1 to 7 appearing on this diagram, when an operator wishes to carry out an authentication operation, he appears in front of the biometric sensor 1 which makes a digital impression of a biometric data element of the user. The sensor sends this impression to the minutiae extraction module 22. The extraction module sends the cryptographic module the data derived from this extraction and the cryptographic module carries out the enciphering operation concerning this data on the basis of the parameters of the cryptographic algorithm and, after having received from the distant biometric verification module the diversification module VD. The biometric verification module is activated upon activation of the biometric sensor 1.

The verification module V also comprises a cryptographic module 200 associated with a non-volatile memory 201 which stores the private key, that is the secret used in the public key cryptographic algorithm, namely the parameter $PRIVd_v$ (if $PRIVd_v$ is the name of the private key).

In accordance with the invention and all its embodiments, no secret is stored in the biometric input module. This biometric input module is a module which can be installed in public buildings and connected via a communication network R to a biometric verification module V which shall hold its secret.

Figure 3:
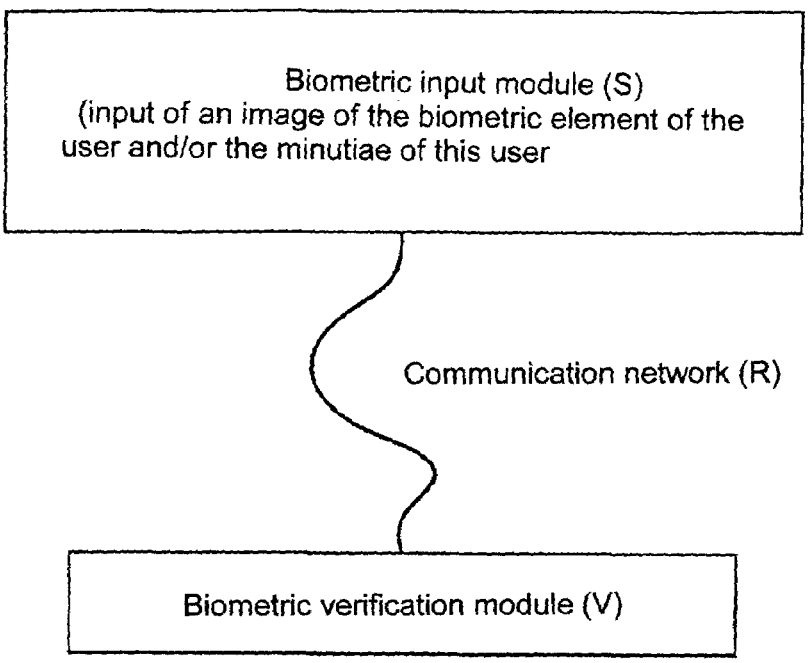
FIG. 3 shows a biometric data authentication module according to the invention.

The diagram of FIG. 3 illustrates an authentication system implementing the method of the invention.

Figure 4:
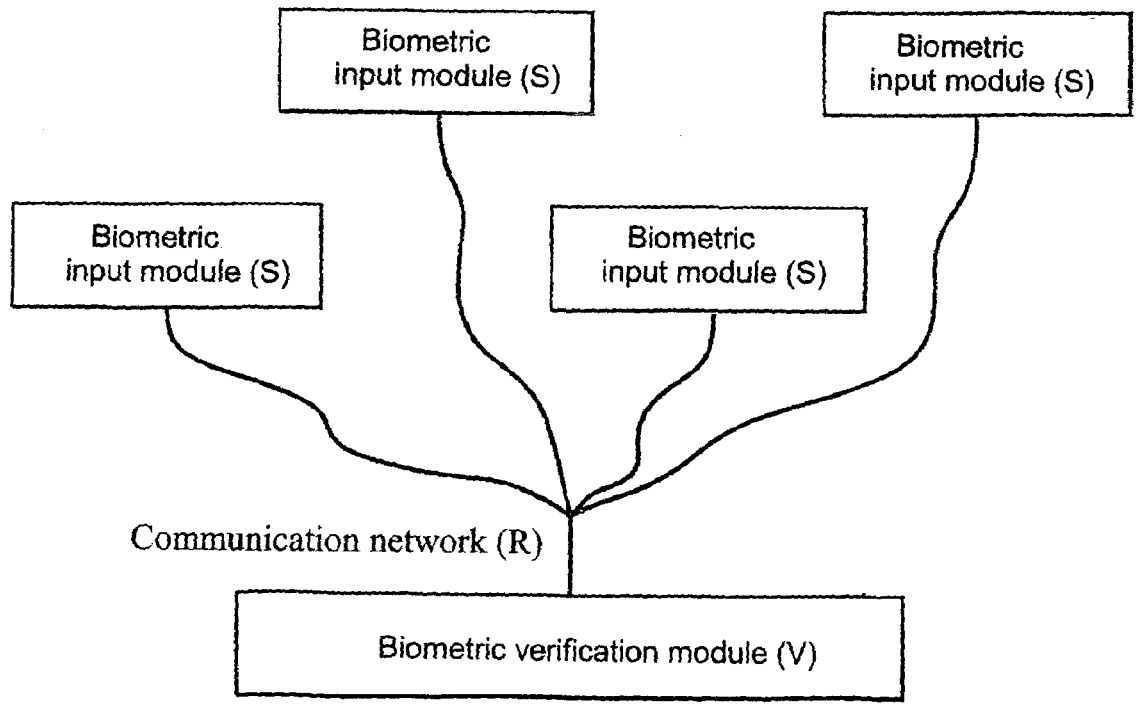
FIG. 4 represents a variant of the authentication system implementing the method of the invention.

As can be seen on the diagram of FIG. 4, the method of the invention is fully adapted to install an authentication system in which several independent and distant biometric input modules S can be connected via a communication network to a single given biometric verification module V.

Thus, the present invention makes it possible to implement a biometric authentication/identification method without biometric verifications needing to be carried out locally (with respect to the biometric input module and the user), without running the risk of theft occurring and the replay of the biometric data and without having to place secret cryptographic elements in the biometric input module.

It is for example possible to have a biometric access control mechanism equipped with several biometric input modules connected to a single centralised biometric verification module, as shown on FIG. 4.

For the purposes of illustration, it is possible to have an access control service applied to the opening/closing of a physical access point (building doors, etc) or a logic access point (computer server, etc).

The invention claimed is:

1. A secure biometric authentication method including communication of biometric data enciphered by at least one biometric data input module not holding a secret key to a verification module, the method comprising the steps of:

for the biometric data input module;
    inputting data of a user,
    concatenating to the data a diversification value,
    enciphering the concatenated data,
    transmitting the enciphered data to the verification module; and for the verification module:
    deciphering the received data by a sole secret key to verify that the diversification value has been taken into account in the enciphering, wherein a separate diversification value is generated by the verification module and communicated to the biometric data input module.

2. The secure biometric authentication method according to claim 1, wherein the diversification value is a random data element.

3. The secure biometric authentication method according to claim 1, wherein the diversification value is the result of a counting.

4. The secure biometric authentication method according to claim 1, wherein the diversification value is a time data element (date, hour).

5. The secure authentication method according to claim 1, wherein the enciphering algorithm is a public key enciphering algorithm.

6. The secure biometric authentication method according to claim 5, wherein the public key of the verification module is communicated to the input module(s) by said verification module on each request for authentication.

7. The secure biometric authentication method according to claim 5, wherein the public key is stored in the biometric data input module.

8. The secure biometric authentication method according to claim 5, wherein the key stored in the input module is a verification key of a certificate, said certificate being the public key of the verification module and being communicated by the verification module to the input module.

9. The secure authentication method according to claim 1, wherein the enciphering algorithm is a secret key symmetrical algorithm.

10. The secure authentication method according to claim 9, wherein the secret key is generated by the input module.

11. The secure authentication method according to claim 9, wherein the secret key is enciphered by an asymmetrical algorithm and the result of the enciphering is communicated to the verification module to enable the verification module to decipher the biometric data.

12. A biometric data authentication system including a biometric data input module not holding any secret key and a biometric data verification module, wherein the biometric data input module comprises means to carry out cryptographic operations to encipher the biometric data end introduce a different diversification value generated by the verification module for each cryptographic operation according to claim 1.

13. The system according to claim 12, wherein the biometric data verification module comprises means to carry out cryptographic operations for deciphering with the aid of a secret key which the biometric data verification module is the only one to hold, the enciphered biometric data received via a communication network, the biometric data having been concatenated to a diversification value, the diversification value being different for each enciphered biometric data element.

14. The system according to claim 13, wherein the biometric data verification module is connected by the communication network to a plurality of biometric data input modules.

15. The system according to claim 13, wherein the biometric data verification module is connected by a non-secure or unprotected communication network to the biometric data input modules.

* * * * *